United States Patent [19]

Gibson

[11] Patent Number: 5,381,414
[45] Date of Patent: Jan. 10, 1995

[54] METHOD AND APPARATUS FOR DETERMINING IF A DATA PACKET IS ADDRESSED TO A COMPUTER WITHIN A NETWORK

[75] Inventor: Glen Gibson, San Ramon, Calif.

[73] Assignee: Advanced Micro Devices, Inc., Sunnyvale, Calif.

[21] Appl. No.: 147,367

[22] Filed: Nov. 5, 1993

[51] Int. Cl.⁶ .............................................. H04J 3/24
[52] U.S. Cl. ................................. 370/94.2; 455/38.3; 455/343
[58] Field of Search ...................... 371/20.1, 20.2, 20.4, 371/67.1, 25.1, 67.1, 68.2, 71; 370/13, 14, 16, 60, 61, 94.1, 85.13, 94.2; 455/343, 38.1, 38.2, 38.3; 364/707; 375/10, 7

[56] References Cited

U.S. PATENT DOCUMENTS

| 4,627,052 | 12/1986 | Hoare et al. | 370/85.13 |
| 4,737,953 | 4/1988 | Koch et al. | 370/85.13 |
| 5,018,133 | 5/1991 | Tsukakoski et al. | 370/85.13 |
| 5,081,621 | 1/1992 | Sugimoto | 370/85.13 |

Primary Examiner—Douglas W. Olms
Assistant Examiner—Ajit Patel
Attorney, Agent, or Firm—Raymond Kwong; Joseph A. Sawyer, Jr.

[57] ABSTRACT

A system is disclosed that allows a computer system within a network environment to determine whether a data packet is to be processed by a particular computer system. This is accomplished through an address matching scheme that provides for an LED indication that the computer is to utilize the data packet provided by the network. In so doing, the system provides more capability to the computers on a network to operate more efficiently.

12 Claims, 3 Drawing Sheets

METHOD AND APPARATUS FOR DETERMINING IF A DATA PACKET IS ADDRESSED TO A COMPUTER WITHIN A NETWORK

FIELD OF THE INVENTION

The present invention is directed toward a computer network and more particularly to determine if a particular computer is receiving data on such a network.

BACKGROUND OF THE INVENTION

Ethernet controllers have traditionally supported a plurality of light emitting diode (LED) indicators. These indicators have generally been associated with ethernet controller cards that are plugged into personal computers utilized within the network. These LED indicators are generally utilized for diagnostics purpose to determine if the controller is functioning properly.

Accordingly, the LED indicators are utilized to determine if a controller card is transmitting, receiving, detecting collision, polarity and link status. In a typical network environment, when a signal is provided from one computer to another on a network, the other computer on the network receives this same data and the receive LED indicator on all the computers on the network will be activated.

Oftentimes, there are other reasons, that it is important for a particular computer to have an indication that a data packet is being transmitted on the network that must be processed by the particular computer. For example in some environments it is important that the power be conserved when the computers are utilized in such networks. Power management schemes are known that are utilized directly within a personal computer. A power management scheme is one that conserves power by putting the computer in a 'sleep' mode allowing it to only draw enough power to maintain information in its memory. Even though the computer is on, it is almost completely inactive. This 'sleep' mode can be triggered either manually or automatically, for example, when the computer remains idle for a predetermined amount of time. However, there are presently no power management schemes related to the detection of network activity or the like. Thus, whenever there are network activities on the network, all computers within the network will be turned on (or 'awoke'), that is, taken out of the 'sleep' mode, regardless of whether the network activities are addressed to any specific computer within the network.

Hence, there is a long-felt but unsatisfied need to provide a system for allowing a controller on a computer within a network to determine if a data packet has arrived that the computer is to process. The present invention addresses such a need.

SUMMARY OF THE INVENTION

A system is disclosed which allows for determining whether a particular data packet is to be addressed to a computer system within a network. In one aspect a method for determining if a data packet is addressed to a computer system in a network is disclosed. In this method the computer system has an address and the data packet comprises a plurality of addresses indicating which computer systems in the network the data packet is intended to be addressed. The method comprises the steps of: (a) determining if a data packet has been received; (b) determining if one of the addresses on the data packet matches the address of the computer system if a data packet has been received; and (c) providing a first signal if one of the addresses on the data packet matches the address of the computer system.

In another aspect, a network controller for determining if a data packet is addressed to a computer system in a network is disclosed. In the network, the computer system has an address and the data packet comprises a plurality of addresses indicating which computer systems in the network the data packet is intended to be addressed. The network controller comprises a register means for receiving the data packet; a memory means for storing the address of the computer system, and a comparator means coupled to the register means and the memory means for providing a first signal if one of the addresses of the data packet matches the address of the computer system and for providing a second signal if none of the addresses match the address of the computer system.

The present invention provides for an improved method and apparatus for ensuring that the computer system identifies whether a particular data packet is to be processed by the computer system.

DETAILED DESCRIPTION

The present invention is directed toward an improvement in a peripheral controller. The following description is presented to enable one of ordinary skill in the art to make and use the invention as provided in the context of a particular application and its requirements. Various modifications to the preferred embodiments will be readily apparent to those skilled in the art, and the generic principles defined here may be applied to other embodiments. Thus, the present invention is not intended to be limited to the embodiments shown, but is to be accorded the widest scope consistent with the principles and novel features disclosed herein.

Figure 1:
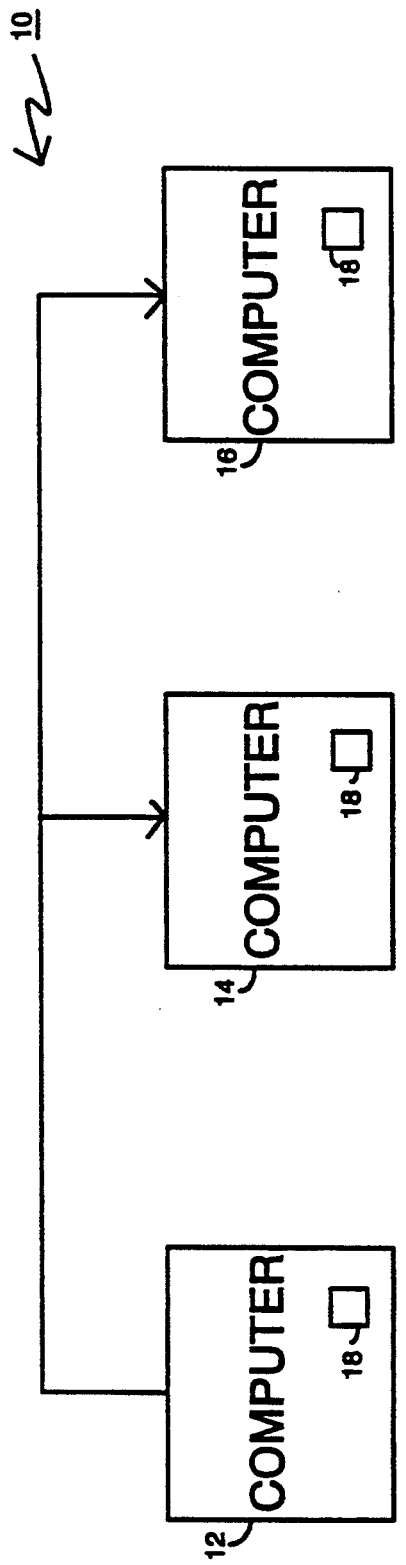
FIG. 1 is a simple block diagram of a typical network of computers.

Referring now to FIG. 1 what is shown is a simplified block diagram of an ethernet network 10. It should be understood that this diagram shows only those portions of the network relevant to the present invention. One of ordinary skill in the ad recognizes that there are more details to the operation of the network for its efficient operation. In such a network 10, there are a plurality of computers 12, 14 and 16. In this embodiment, there are a variety of LED indicators. These LED indicators have been traditionally used to convey certain information to the user for diagnostic purposes. Typically, these indicators have been utilized for a variety of operations such as TRANSMIT, RECEIVE, COLLISION DETECTION, BABBLE, POLARITY, and LINK STATUS information. LINK STATUS information is the only indicator which is required by the IEEE 802.3 10BASE-T specification. All of the other above-mentioned LED indicators although being optional are typically provided in most ethernet cards.

For example, the RECEIVE LED indicator provides that a computer on the network 10 is receiving data on the network. Referring again to FIG. 1, if computer 12 sends a data packet to computer 14, the RECEIVE LED indicators 18 on computer 14 and 16 will turn on because the computer 16 received the packet even though the data packet was not addressed to that computer 16. Therefore although this works effectively for its intended purposes, this indicator does not provide whether the information that the computer receives must be processed by the computer that receives the information. As has been before mentioned this function is important to allow a computer to conserve power while no network activity is being directed to that particular computer in the network.

Figure 2:
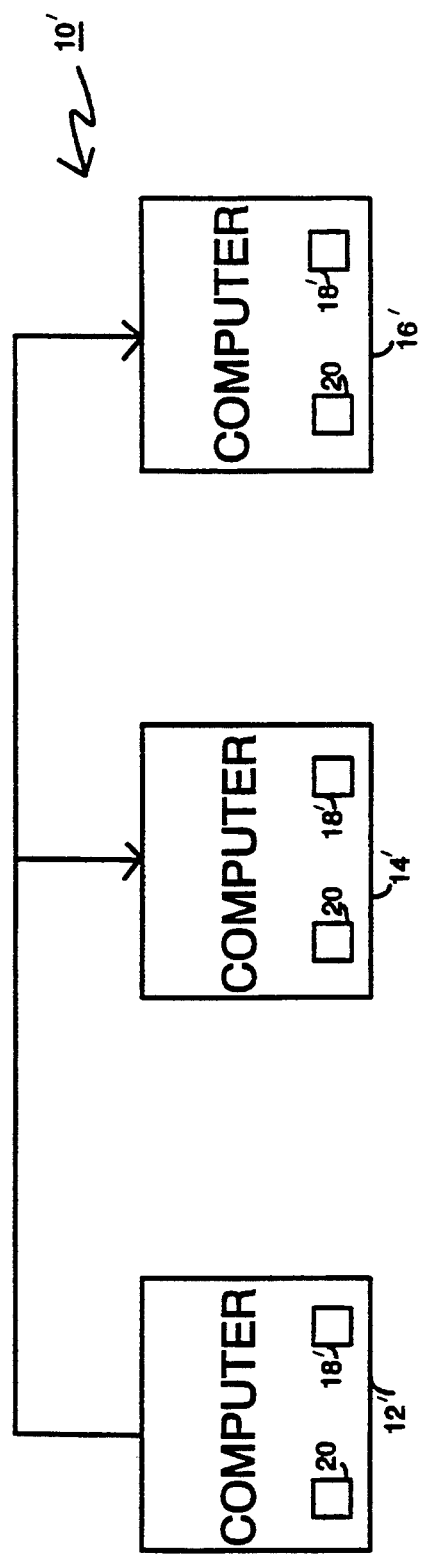
FIG. 2 is a block diagram of a network of computers operating in accordance with the present invention.

The present invention comprises an improvement to the RECEIVE LED indicator. This new LED indicator is referred to as the RECEIVE ADDRESS MATCH LED indicator. This indicator indicates receive activity on the network that has passed the IEEE match function for this computer. All address matching modes are included. (Physical, Logical filtering, Promiscuous, Broadcast, and External Address Detection Interface(EADI)). In the context of this application, physical means the actual address, logical means that multiple devices can have the same address, broadcast means any computer can receive the message and promiscuous means that a particular computer can hear all messages on the network, EADI means that the data is encoded. Refer now to FIG. 2 which is similar to the network of FIG. 1 except there is an additional LED indicator 20 which corresponds to the RECEIVE ADDRESS MATCH indication. In this Figure, if computer 12' sends a data packet to computer 14' that has the RECEIVE ADDRESS MATCH LED indicator 20, that indicator 20 will now light and the indicator 20 on computer 16' will not be on. Similarly if a packet is sent from computer 12' to computer 16' the RECEIVE ADDRESS MATCH LED indicator 20 at computer 16' will turn on and the RECEIVE ADDRESS MATCH LED indicator 20 on computer 14' will not turn on.

Figure 3:
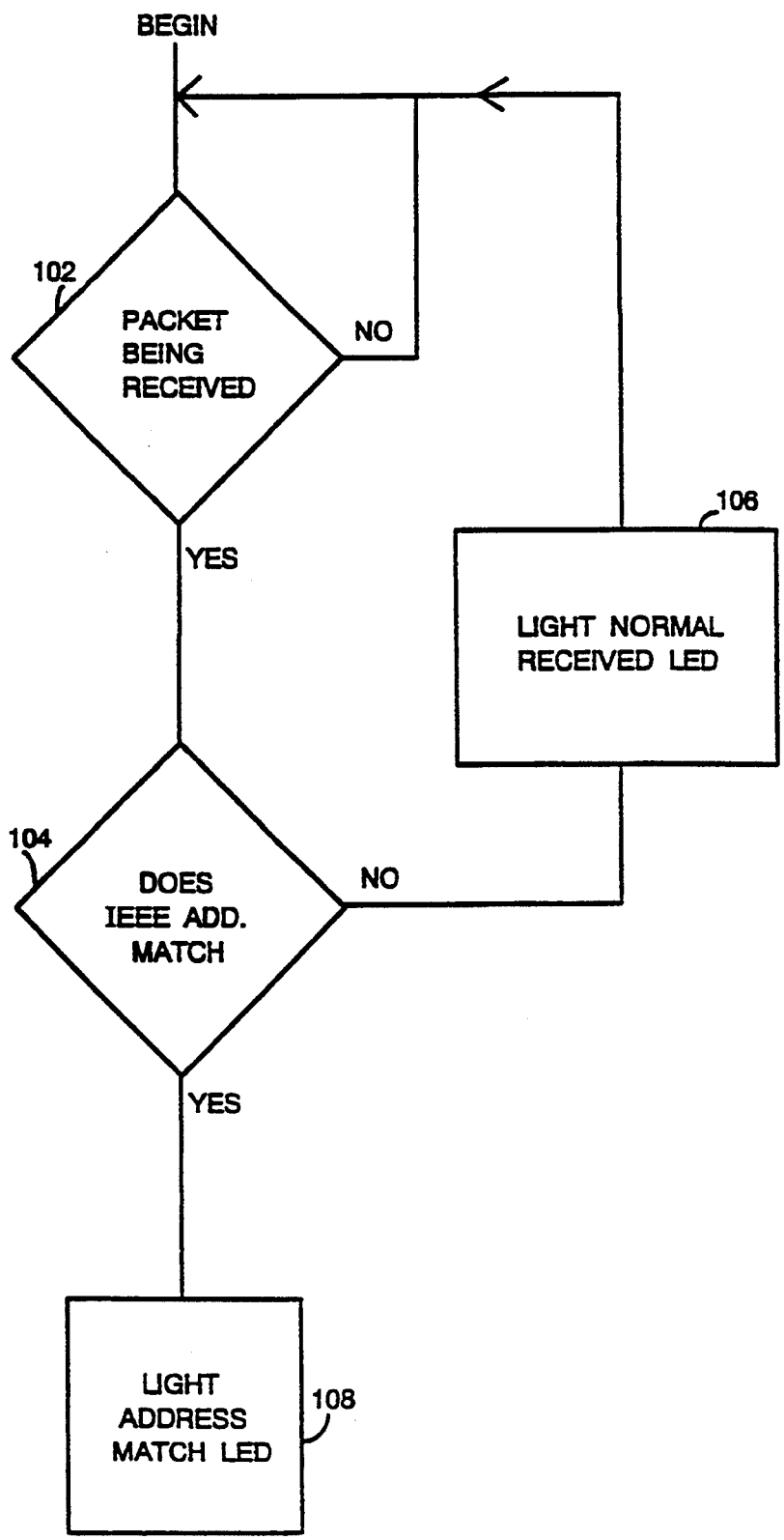
FIG. 3 is a state diagram of the operation of a system in accordance with the present invention.

Referring now to FIG. 3 what is shown is a state diagram of the operation of the RECEIVE ADDRESS MATCH indication. Accordingly, it is first determined if a packet is being received via step 102, if the answer is no then return to Begin. If the answer is yes then it must be determined whether there is an address match via step 104 if the answer is no then RECEIVE LED indicator is turned on via step 106. If on the other hand, the answer is yes the RECEIVE ADDRESS MATCH LED indicator will be turned on via step 108.

Figure 4:
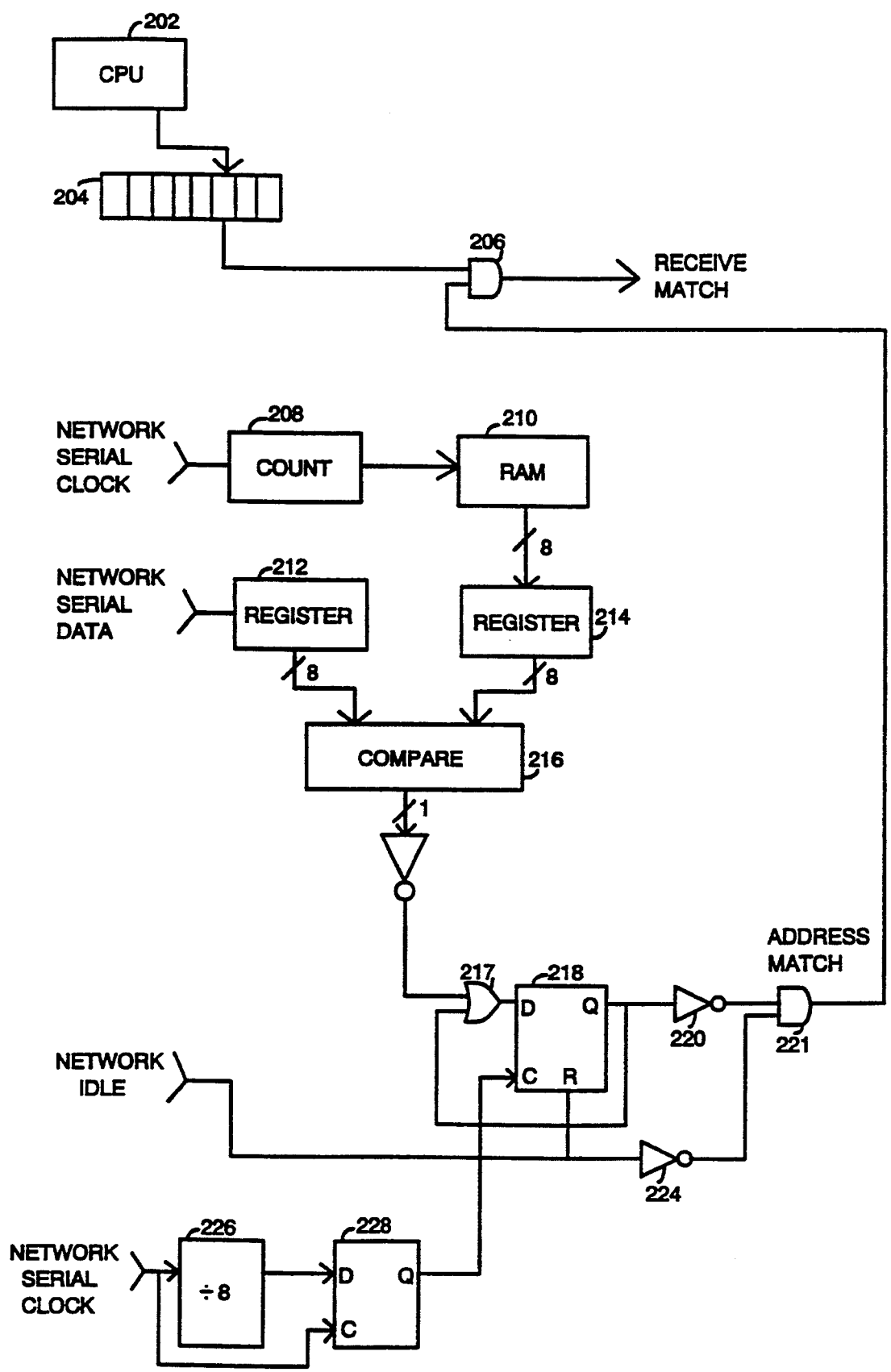
FIG. 4 is a block diagram of one embodiment of the system of FIG. 2.

Referring now to FIG. 4 what is shown is a block diagram of an embodiment to implement the state diagram of FIG. 3. In this embodiment, a central processing unit (CPU) 202 within the computer causes a RECEIVE MATCH ENABLE signal to be provided from a register 204 to one input of an AND gate 206. The other input of the AND gate 206 is coupled to receive an ADDRESS MATCH indication from flip flop 218, via inverter 220 and AND gate 221. A one-byte register 212 receives a data bitstream from the network representing the address of a particular computer within the network. Network CLOCK is used to increment counter 208. The counter 208 in turn causes the random access memory (RAM) 210 to load address information to a register 214. The contents of the register 212 is compared to the register 214 via a comparator 216. In this embodiment, the data from the bitstream of the network is compared to the contents of the RAM 210 one byte at a time to determine if there is an address match. If there is an address match, then flip flop 218 (clocked by a ½ network speed clock generated through divide circuit 226 and delay flip flop 228) and OR gate 217 (coupled to comparator 216) provide an ADDRESS MATCH output via inverter 220 and AND gate 221, thereby providing the ADDRESS MATCH indication, which through AND gate 206 provides the RECEIVE MATCH indication. If there is not a match, the RECEIVE MATCH indication provided via AND gate 206 is false. Typically all of the above elements except the CPU 202 is located in a network controller card within the computer. When the network is idle, a non-match condition is generated through inverter 224 and AND gate 221.

Accordingly through the present invention a computer in a network can identify whether a particular data packet is to be provided to that computer. This result is accomplished through the use of a new LED indicator RECEIVE ADDRESS MATCH in conjunction with circuitry within a network or ethernet controller within the computer. Through this indicator, a computer can determine whether a particular data packet is to be processed by the computer.

It should be understood that various address matches can be made within the controller of the computer. The above identified match will provide information to the computer that network activity is taking place that the computer should be aware. This has significant utility in power management schemes in which the controller can remain active while the rest of the computer is powered down. The controller could then activate the computer when the RECEIVE ADDRESS MATCH indicator is on.

It should be understood that the above-described embodiment is merely illustrative of the possible specific embodiments which can represent applications of the principles of the present invention.

Although the present invention has been described in accordance with embodiments shown in the figures, one of ordinary skill in the art recognizes there could be variations to the embodiments and those variations would be within the spirit and scope of the present invention. Accordingly, many modifications may be made by one of ordinary skill in the art without departing from the spirit and scope of the appended claims.

What is claimed is:

1. A method for determining if a data packet is addressed to a computer system in a network, the computer system having an address, the data packet comprises a plurality of addresses indicating which computer systems in the network the data packet is intended to be addressed, the method comprising the steps of:
   (a) determining if the data packet has been received;
   (b) determining if one of the addresses on the data packet matches the address of the computer system if the data packet has been received;
   (c) generating a first signal if one of the addresses on the data packet matches the address of the computer system; and
   (d) turning on the computer system from a sleep mode in a power management scheme in response of the first signal when one of the addresses in the data packet matches the address of the computer system.

2. The method as recited in claim 1 further comprises a step of turning on a first LED in response to the first signal to indicate that one of the addresses on the data packet matches the address of the computer system.

3. The method as recited in claim 1 in which if no data packet has been received, the method further comprises the step of:
   (a1) repeating step (a) to (c) until a data packet has been received.

4. The method as recited in claim 3 in which if none of the addresses on the data packet matches the addresses of the computer system, the method further comprises the steps of:
   (b1) providing a second signal if none of the addresses on the data packet matches the address of the computer system; and
   (b2) repeating step (a) to (c).

5. The method as recited in claim 4 further comprises a step of turning on a second LED in response to the second signal to indicate that a data packet has been received and that none of the addresses on the data packet matches the address of the computer system.

6. A method for determining if a data packet is addressed to a computer system in a network, the computer system having an address, the data packet comprises a plurality of addresses indicating which computer systems in the network the data packet is intended to be addressed, the method comprising the steps of:
   (a) determining if the data packet has been received;
   (a1) repeating step (a) if no data packet has been received;
   (b) determining if one of the addresses on the data packet matches the address of the computer system if the data has been received;
   (c) generating a first signal if one of the addresses on the data packet matches the address of the computer system;
   (d) turning on a first LED in response to the first signal to indicate that the data packet has been received;
   (e) generating a second signal and repeating step (a) to (b) if none of the addresses on the data packet matches the address of the computer system;
   (f) turning on a second LED in response to the second signal to indicate that the data packet has been received and that none of the addresses on the data packet matches the address of the computer system; and
   (g) turning on the computer system from a sleep mode in a power management scheme in response to the first signal when one of the addresses in the data packet matches the address of the computer system.

7. A network controller for determining if a data packet is addressed to a computer system in a network, the computer system having an address, the data packet comprises a plurality of addresses indicating which computer systems in the network the data packet is intended to be addressed, the network controller comprising:
   a first register means for receiving the data packet;
   a second register means for receiving the address of the computer system from storage; and
   a comparator means coupled to the first register means and the second register means for generating a first signal if one of the addresses of the data packet matches the address of the computer system and for generating a second signal if none of the addresses matches the address of the computer system, the first and second signals being responsive to the monitor means; and
   a logic means responsive to the first signal for turning on the computer system from a sleep mode in a power management scheme when one of the addresses in the data packet matches the address of the computer system.

8. The network controller as recited in claim 7 further comprises:
   a first logic means responsive to the first signal for turning on a first LED to indicate that one of the addresses on the data packet matches the address of the computer system.

9. The network controller as recited in claim 8 further comprises:
   a second logic means responsive to the second signal for turning on a second LED to indicate that none of the addresses on the data packet matches the address of the computer system.

10. The network controller as recited in claim 7 further comprises:
    a first logic means responsive to the first signal for turning on a first LED to indicate that one of the addresses on the data packet matches the address of the computer system, the first logic means also responsive to the second signal for turning on a second LED to indicate that none of the addresses on the data packet matches the address of the computer system.

11. A network controller for determining if a data packet is addressed to a computer system in a network, the computer system having an address, the data packet comprises a plurality of addresses indicating which computer systems in the network the data packet is intended to be addressed, the network controller comprising:
    a first register means for receiving the data packet;
    a second register means for receiving the address of the computer system from storage;
    a comparator means for:
      generating a first signal if one of the addresses in the data packet matches the address of the computer system, and
      generating a second signal if none of the addresses in the data packet matches the address of the computer system,
    the first and second signals being responsive to the monitor means;
    a first logic means responsive to the first signal for turning on a first LED to indicate that one of the addresses in the data packet matches the address of the computer system;
    a second logic means responsive to the second signal for turning on a second LED to indicate that none of the addresses in the data packet matches the address of the computer system; and
    a third logic means responsive to the first signal for turning on the computer system from a sleep mode in a power management scheme when one of the addresses in the data packet matches the address of the computer system.

12. The network controller as recited in claim 11, wherein the first and second logic means are identical.

* * * * *